United States Patent
Lozi et al.

(10) Patent No.: US 12,388,653 B1
(45) Date of Patent: Aug. 12, 2025

(54) STATEFUL HASH-BASED SIGNATURES

(71) Applicant: American Express Travel Related Services Company, Inc., New York, NY (US)

(72) Inventors: Hicham Lozi, Palo Alto, CA (US); Peter John Markall, Burgess Hill (GB)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 564 days.

(21) Appl. No.: 17/566,028

(22) Filed: Dec. 30, 2021

(51) Int. Cl.
*H04L 9/32* (2006.01)
*H04L 9/30* (2006.01)

(52) U.S. Cl.
CPC .............. *H04L 9/3247* (2013.01); *H04L 9/30* (2013.01); *H04L 9/3239* (2013.01)

(58) Field of Classification Search
None
See application file for complete search history.

(56) References Cited

U.S. PATENT DOCUMENTS

| | | | | |
|---|---|---|---|---|
| 5,903,882 A * | 5/1999 | Asay | ...................... | G06Q 10/10 713/156 |
| 6,263,348 B1 * | 7/2001 | Kathrow | ............. | G06F 9/44505 707/999.203 |
| 6,697,490 B1 * | 2/2004 | Mizikovsky | .............. | H04L 9/12 380/278 |
| 7,870,089 B1 * | 1/2011 | Hall, III | ................... | H04L 51/08 705/50 |
| 9,537,657 B1 * | 1/2017 | Char | ...................... | H04L 9/0637 |
| 9,697,217 B1 * | 7/2017 | Salyers | ................. | G06F 16/137 |
| 9,830,478 B1 * | 11/2017 | Hale | ....................... | G06F 21/71 |
| 10,216,748 B1 * | 2/2019 | KaruppurRajagopalan | ................. | G06F 16/13 |
| 10,348,505 B1 * | 7/2019 | Crawforth | ............... | H04L 9/321 |
| 10,536,278 B1 * | 1/2020 | Donaldson | ............ | H04L 9/3247 |
| 2004/0196981 A1 * | 10/2004 | Nakano | .................... | G06F 21/10 380/280 |
| 2006/0130154 A1 * | 6/2006 | Lam | ......................... | G06F 21/64 726/30 |
| 2007/0179748 A1 * | 8/2007 | Kanai | .................... | G11B 27/034 702/187 |
| 2008/0010218 A1 * | 1/2008 | Zank | ..................... | G06Q 20/382 705/75 |
| 2009/0193256 A1 * | 7/2009 | Takenaka | ............... | H04L 9/3249 713/176 |
| 2010/0042842 A1 * | 2/2010 | Huang | ................... | H04L 9/3247 380/46 |

(Continued)

*Primary Examiner* — Kambiz Zand
*Assistant Examiner* — Mahabub S Ahmed
(74) *Attorney, Agent, or Firm* — Thomas Horstemeyer, LLP

(57) ABSTRACT

Disclosed are various embodiments for generating and verifying stateful hash-based signatures. A message hash of a message is generated using a cryptographic hash function. Then, the message hash is split into a predefined number of parts of equal size. Next, a value of a signature debt is calculated for each of the predefined number of parts of the message hash. Subsequently, a respective signature part is calculated for each of the predefined number of parts of the message hash by applying the cryptographic hash function to a respective portion of a private key for a number of times equal to the value of the signature debt. Next, the respective signature parts are concatenated to generate a signature for the message.

20 Claims, 8 Drawing Sheets

(56) References Cited

U.S. PATENT DOCUMENTS

| | | | | |
|---|---|---|---|---|
| 2010/0049986 A1* | 2/2010 | Watanabe | H04L 9/0643 | 713/181 |
| 2011/0083015 A1* | 4/2011 | Meier | H04L 9/3247 | 713/176 |
| 2013/0073873 A1* | 3/2013 | Morioka | H04L 9/3249 | 713/193 |
| 2013/0283092 A1* | 10/2013 | Das | G06F 11/2097 | 714/3 |
| 2013/0291082 A1* | 10/2013 | Giladi | H04L 63/08 | 726/7 |
| 2014/0075201 A1* | 3/2014 | Hiwatari | H04L 9/3247 | 713/176 |
| 2014/0173129 A1* | 6/2014 | Basso | H04L 45/7453 | 709/238 |
| 2016/0307113 A1* | 10/2016 | Calapodescu | G06F 16/35 | |
| 2016/0357743 A1* | 12/2016 | Swaminathan | G06F 16/182 | |
| 2016/0380770 A1* | 12/2016 | Whitmer | G06F 21/64 | 713/181 |
| 2017/0116136 A1* | 4/2017 | MacNicol | G06F 16/2255 | |
| 2017/0141924 A1* | 5/2017 | Ryu | H04L 9/3236 | |
| 2017/0161109 A1* | 6/2017 | Khojastepour | G06F 9/5083 | |
| 2017/0177867 A1* | 6/2017 | Crofton | G06F 21/565 | |
| 2017/0220699 A1* | 8/2017 | Luo | G06F 16/90335 | |
| 2017/0272250 A1* | 9/2017 | Kaliski, Jr. | H04L 9/3239 | |
| 2017/0289180 A1* | 10/2017 | Zheng | H04L 63/1416 | |
| 2017/0346639 A1* | 11/2017 | Muftic | H04L 9/3247 | |
| 2018/0232388 A1* | 8/2018 | Burns | G06F 16/285 | |
| 2018/0241565 A1* | 8/2018 | Paolini-Subramanya | H04L 9/3239 | |
| 2018/0253260 A1* | 9/2018 | Marripudi | G06F 3/064 | |
| 2018/0341469 A1* | 11/2018 | Chiang | G06F 13/1668 | |
| 2019/0149338 A1* | 5/2019 | Byrne | H04L 9/3239 | 713/177 |
| 2019/0319798 A1* | 10/2019 | Chalkias | H04L 9/3236 | |
| 2019/0319799 A1* | 10/2019 | Suresh | G06F 9/3877 | |
| 2019/0319800 A1* | 10/2019 | Misoczki | H04L 9/0662 | |
| 2019/0319802 A1* | 10/2019 | Misoczki | H04L 9/3247 | |
| 2019/0342081 A1* | 11/2019 | Tanimoto | H04L 9/0894 | |
| 2020/0059487 A1* | 2/2020 | Malik | H04L 9/0643 | |
| 2020/0099926 A1* | 3/2020 | Tanner | H04N 19/97 | |
| 2020/0272746 A1* | 8/2020 | Zhang | H04N 21/8358 | |
| 2020/0301961 A1* | 9/2020 | Huang | G06F 16/9014 | |
| 2020/0409563 A1* | 12/2020 | Parasnis | G06F 3/067 | |
| 2021/0019418 A1* | 1/2021 | Peeters | H04L 9/3242 | |
| 2021/0058936 A1* | 2/2021 | Gordaychik | H04W 72/0453 | |
| 2021/0081417 A1* | 3/2021 | Chavan | G06F 16/24537 | |
| 2021/0110048 A1* | 4/2021 | Guo | H04L 9/0643 | |
| 2021/0119785 A1* | 4/2021 | Ben-Reuven | H04L 9/3239 | |
| 2021/0273807 A1* | 9/2021 | Wertheim | G06F 9/466 | |
| 2022/0078024 A1* | 3/2022 | Misoczki | G06N 10/00 | |
| 2022/0086009 A1* | 3/2022 | Vacek | H04L 9/0877 | |
| 2022/0100873 A1* | 3/2022 | Yoon | G06F 21/575 | |
| 2022/0107931 A1* | 4/2022 | Paduroiu | G06F 16/2365 | |
| 2022/0278832 A1* | 9/2022 | Wiseman | H04L 9/3247 | |
| 2022/0407717 A1* | 12/2022 | Wiseman | H04L 9/3247 | |
| 2023/0030703 A1* | 2/2023 | Shveidel | G06F 12/0238 | |
| 2023/0060654 A1* | 3/2023 | Fouladi Fard | G06F 16/9014 | |
| 2023/0068589 A1* | 3/2023 | Maurer | G06F 9/45508 | |
| 2023/0116909 A1* | 4/2023 | Völcker | H04L 9/3236 | 705/51 |
| 2023/0163975 A1* | 5/2023 | Kelly | H04L 9/0643 | 713/168 |
| 2023/0185942 A1* | 6/2023 | Hanebeck | G06Q 10/0639 | 726/28 |
| 2023/0186241 A1* | 6/2023 | Nakamura | G06F 21/64 | 713/176 |
| 2023/0208638 A1* | 6/2023 | Manevich | H04L 9/3247 | 713/171 |
| 2023/0283479 A1* | 9/2023 | Shan | H04L 63/123 | 713/155 |
| 2024/0039734 A1* | 2/2024 | De Santis | H04L 9/3236 | |

* cited by examiner

STATEFUL HASH-BASED SIGNATURES

BACKGROUND

Cryptographic signatures are used to verify the integrity, validity, and veracity of messages or data transmitted between one party to another. Multiparty signatures allow for multiple parties to attest to the integrity, validity, and veracity of messages or data. Generally, multiparty signature schemes are sequential, with a first party signing the message or data, then a second party signing the combination of both the message or data and the first signature, a third party signing the combination of both the message or data, the first signature, and the second signature, etc. Accordingly, multiparty signatures may be slow to perform or verify because the signatures of the signing parties are generated sequentially and must also be verified sequentially. Moreover, existing signature schemes often rely on algorithms or protocols that are decades old, and may be susceptible to cryptanalysis by advancing computing technology.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for using stateful hashed-based signatures for signing and verifying the integrity of messages or data. The various embodiments of the present disclosure allow for multiple parties to sign a single message or other item of data in parallel by the parties. Similarly, the various embodiments of the present disclosure allow for signatures to be verified in parallel. As a result, signature creation and verification can be performed more quickly and efficiently compared to other approaches where multiple parties sequentially sign a message or item of data. Moreover, the various embodiments of the present disclosure can leverage algorithms that are resistant against cryptanalytic attacks by quantum computers, making them more secure compared to digital signature schemes that are susceptible to cryptanalysis by quantum computers.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
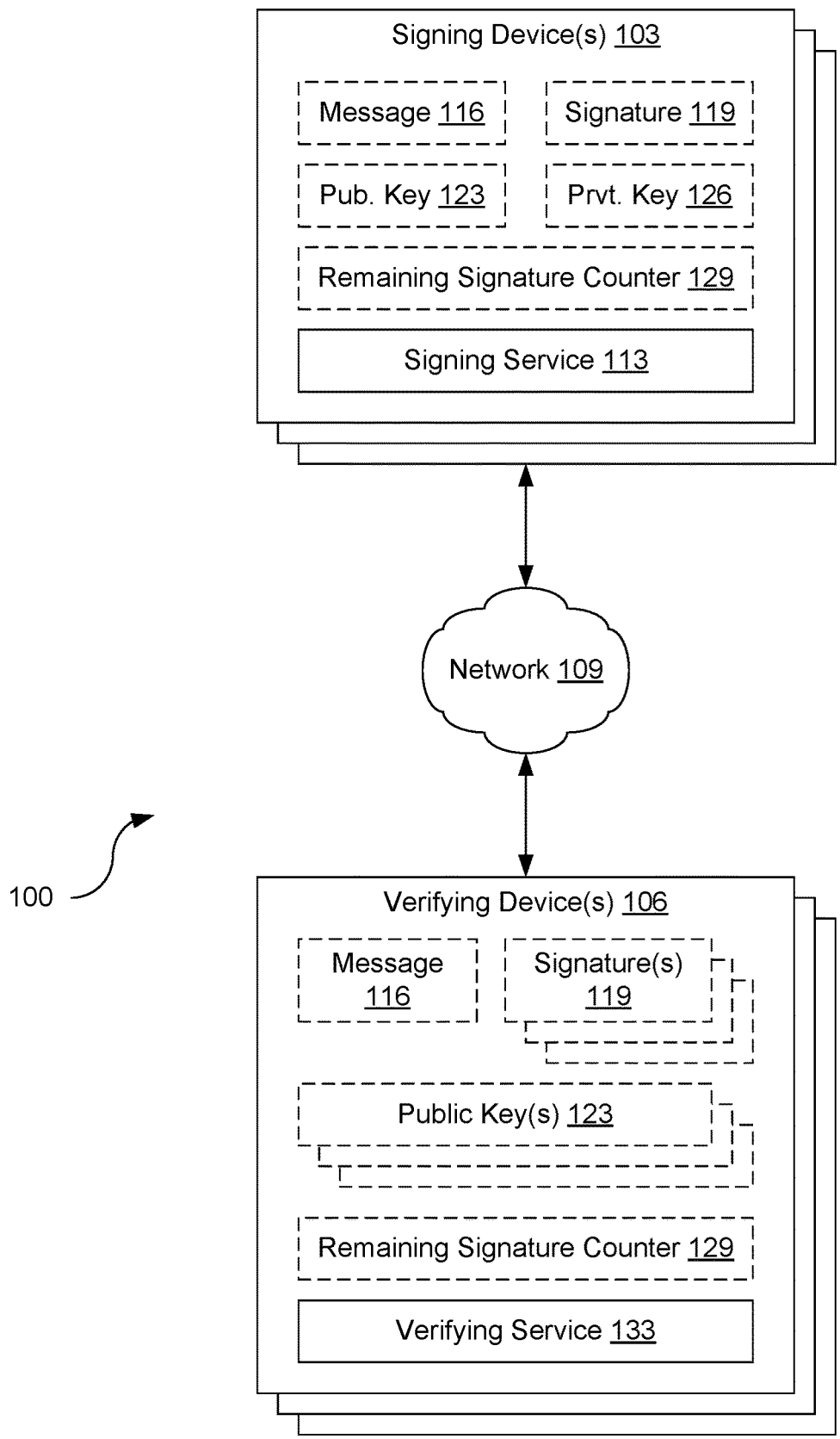
FIG. 1 is a drawing of a network environment according to various embodiments of the present disclosure.

With reference to FIG. 1, shown is a network environment 100 according to various embodiments. The network environment 100 can include one or more signing devices 103 and one or more verifying devices 106. The signing devices 103 and the verifying devices 106 can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The signing device(s) 103 and the verifying device(s) 106 are representative of computing devices that include a processor, a memory, and/or a network interface. For example, the computing devices can be configured to perform computations on behalf of other computing devices or applications. As another example, such computing devices can host and/or provide content to other computing devices in response to requests for content.

Various applications or other functionality can be executed by a signing device 103. The components executed by a signing device 103 can include a signing service 113. Other applications or services can also be executed by a signing device 103 according to various embodiments of the present disclosure.

Various data can also be stored on a signing device 103. This data can include a message 116, a signature 119, a public key 123 and a respective private key 126, and a remaining signature counter 129.

The signing service 113 can be executed by the signing device 103 to generate a signature 119 for a message 116 using the private key 126. In situations where multiple signing devices 103 are cooperating to generate a signature 119 for the message 116, the signing service 113 can generate a signature 119 for a portion of the message assigned to the signing device 103.

The message 116 can represent any item of data to be signed by the signing service 113. Examples of messages 116 can include payment transaction requests, payment transaction authorizations, web service requests or responses, files, etc. Messages 116 can come from any source and, in some implementations, can be assembled by multiple parties that utilize a predefined message schema. For example, if the message 116 represented a credit or charge card transaction, the message could have a schema that specified the location within the message that the account number, transaction amount, credit card verification code (CVC), account holder name, merchant identifier, and/or additional information should be located.

The signature 119 can represent a cryptographic signature of the message 116. The signature 119 can be generated by the signing service 113 using the private key 126, thereby allowing the signature 119 to be verified by the verifying service 133 using the respective public key 123 for the private key 126.

The public key 123 and the private key 126 can represent respective members of an asymmetric cryptographic key pair. The public key 123 and the private key 126 can be generated by the signing service 113 using the approaches discussed later in the present disclosure.

The remaining signature counter 129 is the state counter representing the number of remaining possible signatures that can be generated using the private key 126. In some implementations, the remaining signature counter 129 can be implemented as a decrementing counter that tracks the number of times the private key 126 has been used by the signing service 113 to generate a signature 119. The initial value of the remaining signature counter 129 can be set to any value greater than or equal to one that is appropriate for the security model or threat environment envisioned for a particular deployment. Where it is desired to replace the public key 123 and private key 126 frequently, the initial value of the remaining signature counter 129 can be set to a low initial value. Where it is desired to replace the public key 123 and the private key 126 infrequently, the initial value of the remaining signature counter 129 can be set to a higher initial value. Once the remaining signature counter 129 reaches a value of zero, thereby indicating that the private key 126 can no longer be used for generating new signatures 119, the signing service 113 can generate a new asymmetric key pair that includes a new public key 123 and a new private key 126. The signing service 113 can also reset the remaining signature counter 129 to the initial value once the new asymmetric key pair is generated.

Various applications or other functionality can be executed by a verifying device 106. The components executed by a verifying device 106 can include a verifying service 133. Other applications or services can also be executed by a verifying device 106 according to various embodiments of the present disclosure.

Various data can also be stored on a verifying device 106. This data can include a message 116, one or more signatures 119 of the message 116, one or more public keys 123 for verifying the signature 119, and a remaining signature counter 129.

The verifying service 133 can be executed by the verifying device(s) 106 to verify the integrity and validity of the signature 119 of the message 116. In situations where multiple signing devices 103 signed portions of the message 116 to create separate signatures 119, the verifying service 133 could verify the integrity and/or validity of the signatures 119 of the message 116 in parallel.

Next, a general description of the operation of the various components of the network environment 100 is provided. More detailed descriptions of the various operations and interactions are provided in the discussion accompanying FIGS. 2-8.

First, a cryptographic hash function $f$ is selected for use by the signing service 113 and the verifying service 133. For reference, the notation $f_n(x)$ indicates that the cryptographic hash function $f$ is applied n times to the input x. For example, $f_3(x)=f(f(f(x)))$ would indicate that the cryptographic hash function $f$ has been applied three times.

Examples of cryptographic hash functions include the Secure Hash Algorithm 2 (SHA-2) family of cryptographic hash functions, including SHA-256 and SHA-512, the Secure Hash Algorithm 3 (SHA-3) cryptographic hash function, the BLAKE2 cryptographic hash function, the BLAKE3 cryptographic hash function, etc. The cryptographic has function $f$ has a length $Len(f)$, which is the length of the output of $f$ in bits. For example, if $f$ is the SHA-256 cryptographic hash function, then $Len(f)$ would be 256. The $Len(f)$ might be selected as a multiple of eight, in order to simplify calculations, but this is not a requirement. The $Len(f)$ should also be a composite number.

The number of divisions to be used by the signing service 113 and the size of each division are also selected. These could be selected or negotiated by the signing service 113 and the verifying service 133 each time a signature 119 is to be generated, or they could be preselected in advance for all signatures to be generated. The product of the number of divisions, denoted as d, and the size of the divisions, denoted as m, must equal the length $Len(f)$ of the cryptographic hash function $f$. For example, if length $Len(f)=256$ bits, then acceptable combinations of d and m would be d=32 and m=8, d=8 and m=32, d=16 and m=16, d=4 and m=64, d=2 and m=128, etc.

The signing service 113 can then generate a public key 123 and a private key 126. At the time the public key 123 and private key 126 are generated, the signing service 113 can also set the remaining signature counter 129 to an initial value c, where $c \geq 1$. The signing service 113 can also select a value for the schema debt, denoted n, where $n > c*(2^m+1)$.

To sign a message 116, the signing service can use the hash function $f$ to calculate a hash of the message 116. The hash of the message 116 can then be split into d parts of m length. A signature 119 for each part can be generated using the private key 126. In some implementations, one or more subsets containing a portion of the parts of the message 116 can be signed using different private keys 126. This could be done in parallel by multiple instances of the signing service 113 or by multiple signing devices 103. This might occur, for example, when multiple parties wish to sign the same message 116 or a portion of the message 116. The signature 119 can then be assembled by concatenating the signatures 119 in the same order as the d parts of the hash of the message 116.

Once the signature 119 is generated, the signing service 113 can decrement the remaining signature counter 129. In some implementations, the signing service 113 can append the decremented remaining signature counter 129 to the signature 119 in order to synchronize the remaining signature counter 129 with the verifying service 133. However, other approaches for synchronizing the remaining signature counter 129 can also be used according to various embodiments of the present disclosure. The signature 119 can then be sent by the signing service 113 to the verifying service 133. In other implementations, the signature 119 could be relayed or provided to the verifying service 133 through intermediary or third-party applications. In some implementations, the signing service 113 could also provide the message 116 to the verifying service 133. In other implementations, the message 116 could be provided to the verifying service 133 by other applications or services.

The verifying service 133 could then verify the signature 119 of the message 116. First, the verifying service 133 could split the message 116 and the signature 119 into d parts of m length. Then, verifying service 133 could calculate a key portion for each of the into d parts of the signature 119. If each key portion matches a respective portion of the public key 123 used to create that portion of the signature 119, then the verifying service 133 could determine that the signature 119 is valid for the message 116. If multiple private keys 126 were used to generate portions o the signature 119, then those portions of the signature 119 could be verified in parallel by the verifying service 133 or by multiple instances of the verifying service 133 executing on multiple verifying devices 106.

Figure 2:
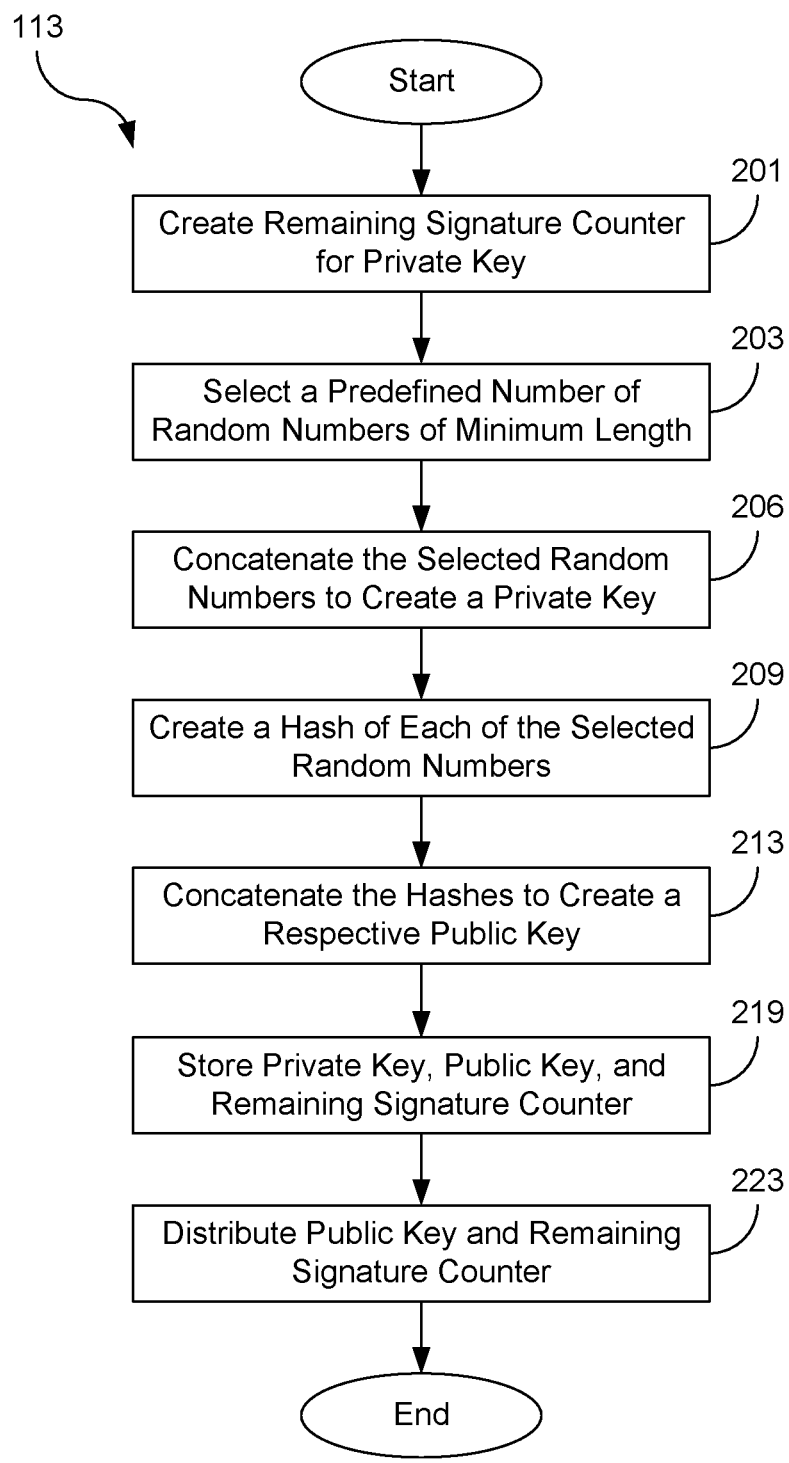
FIG. 2 is a flowchart depicting an example of the creation of an asymmetric key pair in the network environment of FIG. 1 according to various embodiments of the present disclosure.

Referring next to FIG. 2, shown is a flowchart that provides one example of the operation of a portion of the signing service 113 to generate an asymmetric key pair that includes a public key 123 and a private key 126 for signing messages 116 in various implementations of the present disclosure. The flowchart of FIG. 2 provides merely an example of the many different types of functional arrangements that can be employed to implement the operation of the depicted portion of the signing service 113. As an alternative, the flowchart of FIG. 2 can be viewed as depicting an example of elements of a method implemented within the network environment 100.

Beginning with block 201, the signing service 113 can create or initialize a remaining signature counter 129 for the private key 126. The value of the remaining signature counter 129 could be set to a predefined value according to the security requirements of the private key 126, with a lower value for the remaining signature counter 129 causing the public key 123 and the private key 126 to be replaces more frequently and a larger value for the remaining signature counter 129 causing the public key 123 and the private key 126 to be replaced less frequently. A value of one for the remaining signature counter 129 would cause the public key 123 and private key 126 to effectively act as a single use key pair. For simplicity in the following formulas, the initial value of the remaining signature counter 129 is referred to by the variable c when the initial value of the remaining signature counter 129 is used to calculate another value.

Proceeding to block 203, the signing service 113 can select d number of random numbers, denoted as $P_1$ to $P_d$. Each of the random numbers P that are selected should have predefined minimum length Ly that provides sufficient entropy to avoid brute force attacks. In general, $L_p \geq Len(f)$.

Then, at block 206, the signing service 113 can generate the private key 126 by concatenating the random numbers $P_1| \ldots |P_d$ that were selected at block 203. Although the strength of the private key 126 is related to $L_p$, the actual length of the private key is $d*L_p$.

Next, at blocks 209 and 213, the signing service 113 can create the respective public key 123 for the private key 126 generated at block 206. First, at block 209, the signing service 113 apply the cryptographic hash function $f$ a total of n times to each random number P used for the private key 126, where $n=c*(2^m+1)$.

Moving on to block 213, the signing service 113 can then concatenate the resulting hashes in the same order as the respective numbers used for the private key 126. Accordingly, the public key 123 could be depicted as the concatenation of $f_n(P_1)| \ldots |f_n(P_d)$.

Referring to block 219, the signing service 113 could save the public key 123, private key 126, the remaining signature counter 129 on the signing device 103 for later use. Then, at block 223, the signing service 113 could, in some implementations, distributed the public key 123 and/or the remaining signature counter 129 to one or more verifying devices 106 using various communications channels and/or approaches.

Figure 3:
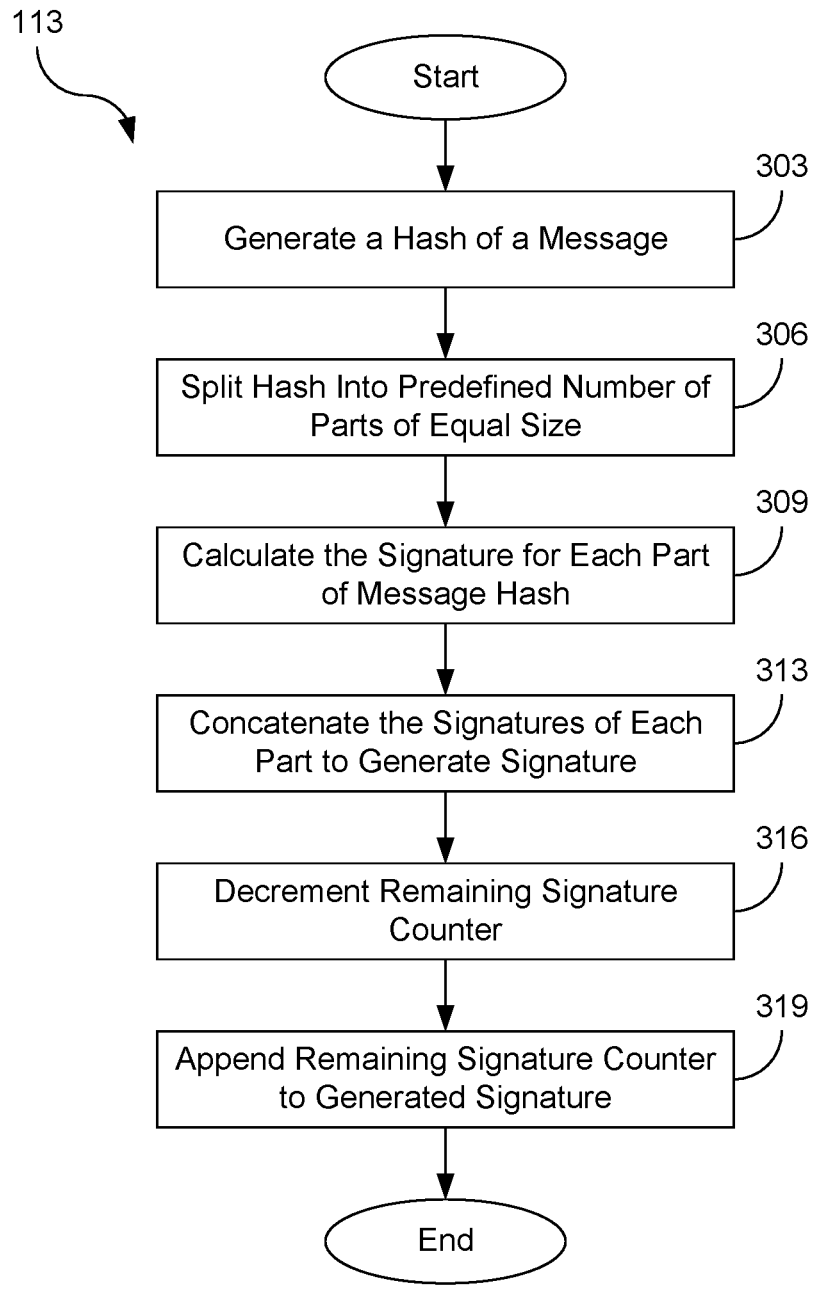
FIG. 3 is a flowchart depicting an example of the generating a signature for a message in the network environment of FIG. 1 according to various embodiments of the present disclosure.

Referring next to FIG. 3, shown is a flowchart that provides one example of the operation of a portion of a single instance of the signing service 113 for signing a message 116. The flowchart of FIG. 3 provides merely an example of the many different types of functional arrangements that can be employed to implement the operation of the depicted portion of the signing service 113. As an alternative, the flowchart of FIG. 3 can be viewed as depicting an example of elements of a method implemented within the network environment 100.

Beginning with block 303, the signing service 113 can generate a hash of the message 116. For example, the entire message 116, denoted as M, could be supplied as an input to the cryptographic hash function $f$, such that the message hash $HM=f(M)$.

Then, at block 306, the signing service 113 can split the message hash HM into d values $HM_1$ to $HM_d$, such that $HM=HM_1| \ldots |HM_d$. As previously mentioned in the discussion of FIG. 1, the length $Len(HM_i)=m$, and the product of $d*m=Len(HM)$.

Next, at block 309, the signing service 113 can calculate the signature for each part $HM_1$ to $HM_d$. First, the signing service 113 can calculate the value of the signature debt for each portion of the message hash HM to be signed, denoted as $s\_debt_i$. The value of $s\_debt_i=HM_i+(rs-1)(2^m+1)$, where "rs" is the current value of the remaining signature counter 129. Then the individual parts of d parts of the signature 119 can be calculated using the respective random numbers $P_1$ to $P_d$ of the private key 126 using the formula $S_i=f_{s\_debt_i}(P_i)$ for each i from 1 to d.

Moving on to block 313, the signing service 113 can concatenate the signature portions $S_i$ for each i from 1 to d, such that the signature 119, denoted as S, is represented by the formula $S=S_1|S_2| \ldots |S_d$.

Proceeding to block 316, the signing service 113 can decrement the remaining signature counter 129 after signature 119 is completed at block 313.

Subsequently, at block 319, the signing service 113 can append the remaining signature counter 129 to the signature 119 generated at block 313. This could be done, for example, to communicate the remaining signature counter 129 to the verifying service 133 in order to synchronize the verifying service 133 with the signing service 113. However, other approaches could also be used to communicate the updated remaining signature counter 129 to the verifying service 133.

Figure 4:
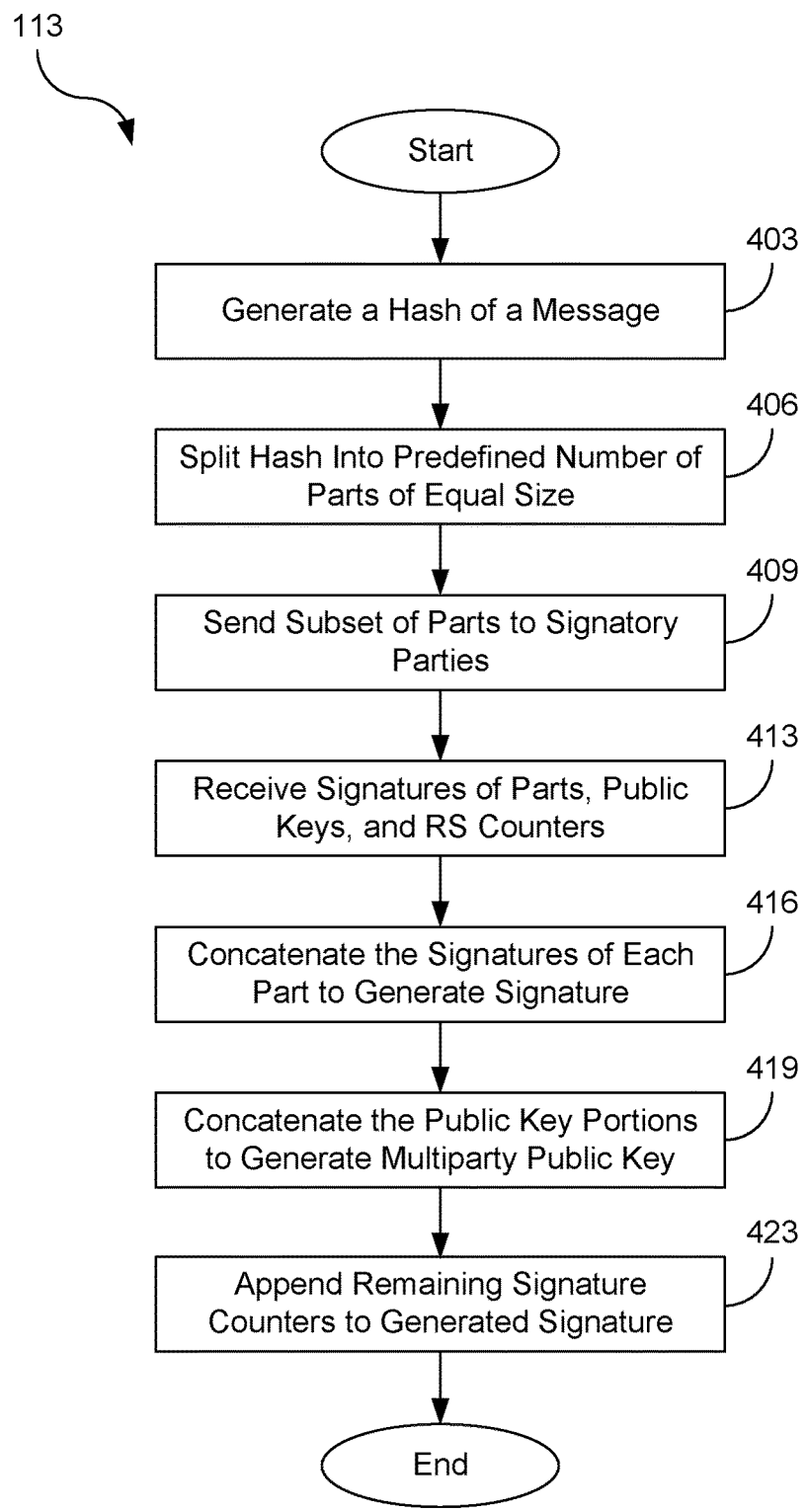
FIG. 4 is a flowchart depicting an example of the generating a signature for a message in the network environment of FIG. 1 according to various embodiments of the present disclosure.

Referring next to FIG. 4, shown is a flowchart that provides one example of the operation of a portion of the signing service 113 to generate signatures 119 for a message 116 in a multiparty signing scheme. The flowchart of FIG. 4 provides merely an example of the many different types of functional arrangements that can be employed to implement the operation of the depicted portion of the signing service 113. As an alternative, the flowchart of FIG. 4 can be viewed as depicting an example of elements of a method implemented within the network environment 100.

Beginning with block 403, the signing service 113 can generate a hash of the message 116. For example, the entire message 116, denoted as M, could be supplied as an input to the cryptographic hash function $f$, such that the hashed message HM=$f$(M).

Then, at block 406, the signing service 113 can split the message hash HM into d values $HM_1$ to $HM_d$, such that HM=$HM_1$| . . . |$HM_d$. As previously mentioned in the discussion of FIG. 1, the length Len($HM_i$)=m, and the product of d*m=Len(HM).

Next, at block 409, the signing service 113 could select send a subset of the parts of the hashed message HM to additional signatory parties (e.g., another signing service 113 executing on another signing device 103). In the example, depicted in the flowchart of FIG. 4, the signing service 113 could send a first third of the portions of the message hash HM to a first signing party, a second third of the portions of the message hash HM to a second signing party, and a remaining third of the portions of the message hash HM to a third signing party. Each of the signing parties could, in parallel, sign their respective portions of the hashed message using the approach previously described at block 309 of FIG. 3.

Moving on to block 413, the signing service 113 can receive the signatures of the respective portions of the message hash HM, the respective portions of the public keys 123 to be used to verify the signatures of the respective portions of the message hash HM, and the respective remaining signature counters 129 of the signing parties.

Although the discussion of blocks 409 and 413 discusses the signing service 113 providing portions of the message hash HM to various parties to sign, it should be noted that the signing service 113 could act as a signatory for one portion of the message hash HM while other parties are provided with other portions of the message hash HM to sign. For example, at blocks 409 and 413, the signing service 113 could sign the remaining third of the portions of the message hash HM, while providing the first and second thirds of the message hash HM to other signatories.

Subsequently, at block 416, the signing service 113 can concatenate the signature portions $S_i$ received at block 413 for each i from 1 to d, such that the signature 119, denoted as S, is could be split such that S=$S_1$|$S_2$| . . . |$S_d$ and the message 116, denoted as M, could be split such that M=$M_1$|$M_2$| . . . |Md.

Then, at block 419, the signing service 113 can create a new multiparty public key 123 that can be used to verify the multiparty signature created at block 419. For example, if the first party created $S_1$ and $S_4$ using $f_n(P_1)$ and $f_n(P_4)$ for the first party, the second party created $S_2$ and $S_5$ using $f_n(P_2)$ and $f_n(P_5)$ for the second party, and third party created $S_3$ and $S_6$ using $f_n(P_3)$ and $f_n(P_6)$ for the third party, then the new multiparty public key 123 would equal the concatenation of $f_n(P_1)|f_n(P_2)|f_n(P_3)|f_n(P_4)|f_n(P_5)|f_n(P_6)$ used by the first, second, and third parties. The new multiparty public key 123 could then be provided to the verifying service 133 through various communications channels to allow the verifying service 133 to verify the signature 119 of the message 116. These communications channels can include or provide various levels of security, authentication, and access controls as appropriate for particular implementations.

Proceeding to block 423, the signing service 113 can append the remaining signature counters 129 of the signing parties to the signature 119 generated at block 416. This could be done, for example, to communicate the remaining signature counters 129 of the signing parties to the verifying service 133 in order to synchronize the verifying service 133 with the signing service 113. However, other approaches could also be used to communicate the updated remaining signature counters 129 to the verifying service 133.

Figure 5:
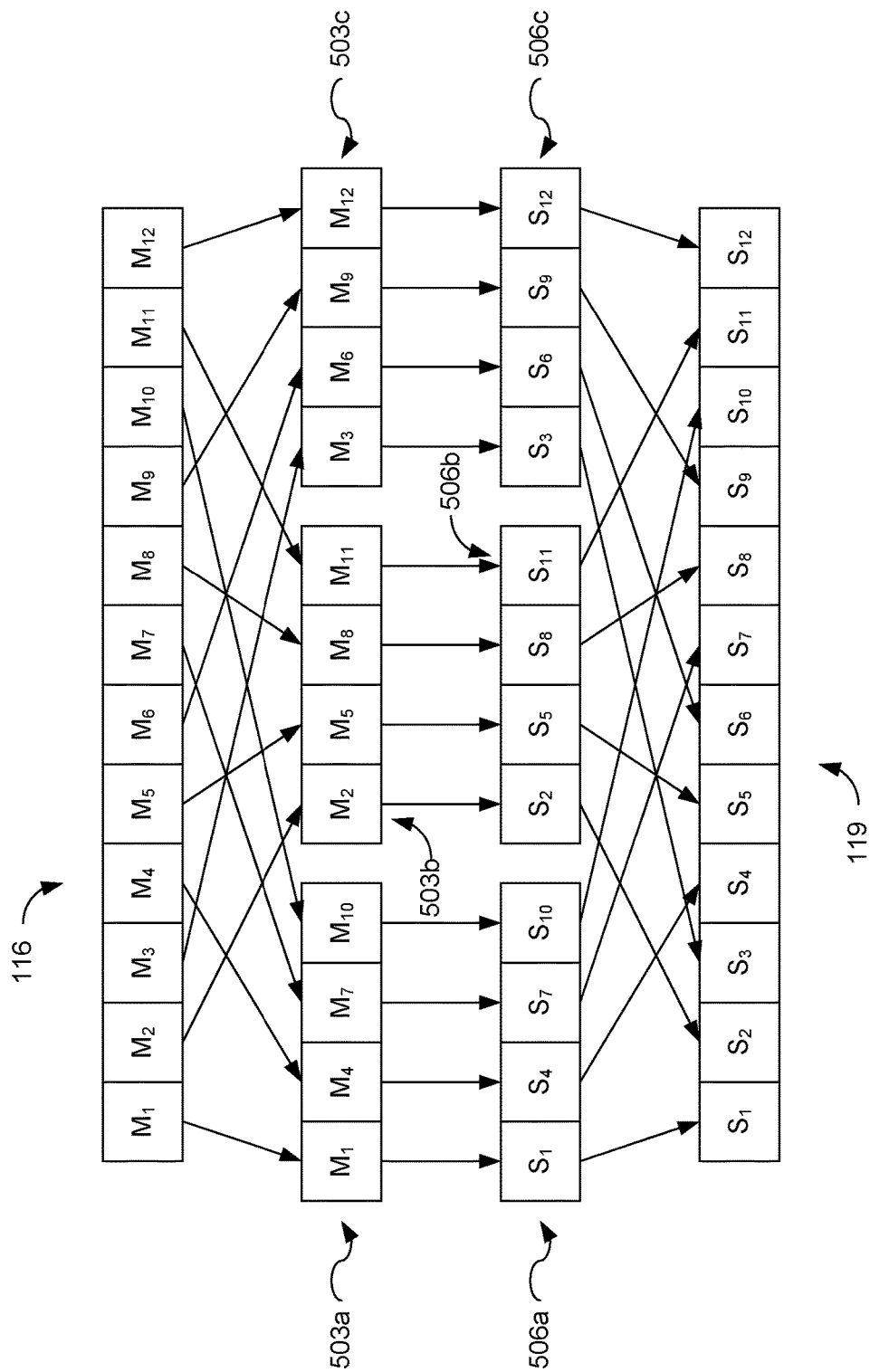
FIG. 5 is a graphical representation of the creation of a signature for a message in the network environment of FIG. 1 according to various embodiments of the present disclosure.

FIG. 5 provides a graphical representation of the multiparty signing process described by the flowchart of FIG. 4. As shown, a message 116 is divided in to d parts of m size, indicated as $M_1$-$M_{12}$ in the illustrated example. The message 116 is split into multiple message subsets 503*a*, 503*b*, and 503*c* (collectively "message subsets 503" or generically a "message subset 503"). Message subset 503*a* contains the concatenation of $M_1|M_4|M_7|M_{10}$. Message subset 503*b* contains the concatenation of $M_2|M_5|M_8|M_{11}$. Message subset 503*c* contains the concatenation of $M_3|M_6|M_9|M_{12}$.

Using the process described in FIG. 4, each message subset 503 could be signed using a separate private key 126 of a separate signing party to generate respective signature subsets 506*a*, 506*b*, and 506*c* (collectively "signature subsets 506" or generically a "signature subset 506"). As shown, signature subset 506*a* contains the concatenation of $S_1|S_4S_7|S_{10}$, as derived from $M_1|M_4|M_7|M_{10}$. Signature subset 506*b* contains the concatenation of $S_2|S_5|S_8|S_{11}$, as derived from $M_2|M_5|M_8|M_{11}$. Signature subset 506*c* contains the concatenation of $S_3|S_6|S_9|S_{12}$, as derived from $M_3|M_6|M_9|M_{12}$.

The signature subsets 506 could then be recombined to create a signature 119. To allow for the multiparty signature 119 to be verified, the signature portions $S_1$-$S_{12}$ could be reordered as illustrated to match the order of the respective message parts $M_1$-$M_{12}$ in the illustrated message 116.

Figure 6:
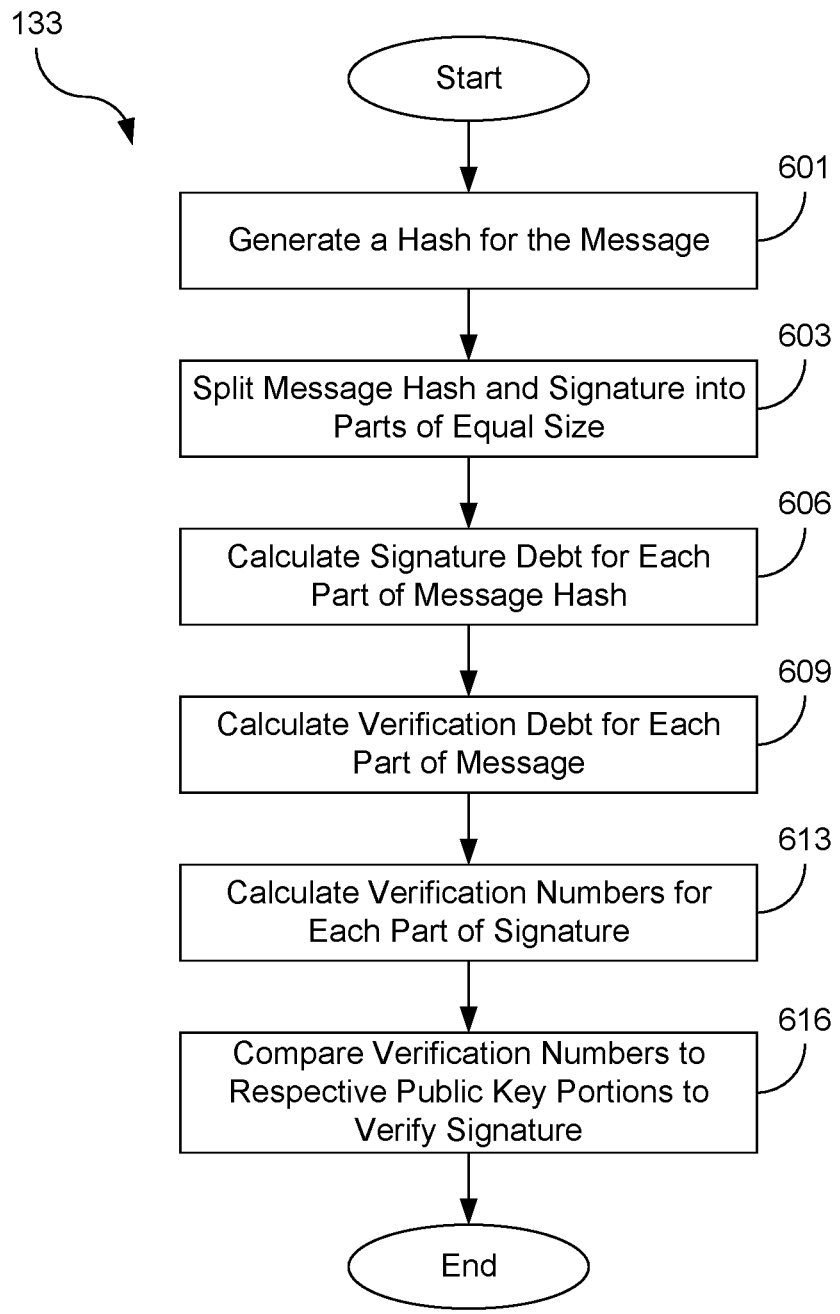
FIG. 6 is a flowchart depicting an example of verifying a signature for a message in the network environment of FIG. 1 according to various embodiments of the present disclosure.

Referring next to FIG. 6, shown is a flowchart that provides one example of the operation of a portion of the verifying service 133 to verify a signature 119 of a message 116. The flowchart of FIG. 6 provides merely an example of the many different types of functional arrangements that can be employed to implement the operation of the depicted portion of the verifying service 133. As an alternative, the flowchart of FIG. 6 can be viewed as depicting an example of elements of a method implemented within the network environment 100.

Beginning with block 601, the verifying service 113 can generate a hash of the message 116. For example, the entire message 116, denoted as M, could be supplied as an input to the cryptographic hash function $f$, such that the hashed message HM=$f$(M).

Next, at block 603, the verifying service 133 can split the message hash HM and the signature 119 into d parts of equal size m. Accordingly, the signature 119 could be split such that S=$S_1$|$S_2$| . . . |$S_d$ and the message hash HM could be split such that HM=$HM_1$| . . . |$HM_d$.

Then, at block 606, the verifying service 133 can calculate the signature debt for each part $HM_1$ to $HM_d$ of the message hash HM of the message 116. First, the verifying service 133 can calculate the value of the signature debt for each portion of the message hash HM of the message that was signed, denoted as $s\_debt_i$. The value of $s\_debt_i = HM_i+(rs-1)(2^m+1)$, where "rs" is the current value of the remaining signature counter 129. As previously discussed the value "rs" may be have been appended to the signature 119 being verified in order to synchronize the remaining signature counter 129 between the signing service 113 and the verifying service 133.

Moving to block 609, the verifying service 133 can calculate the verification debt for each part of the message 116. The verification debt can represent the number of iterations of the cryptographic hash function $f$ to be performed on each portion of the signature 119 to reach the public key 123 for said portion. Mathematically, the verification debt is equal to the difference between the schema debt n and the signature debt, as represented by the equation v_debt$_i$=n-s_debt$_i$.

Next, at block 613, the verifying service 133 can calculate a verification number V$_i$ for each signature portion S$_i$. For any given signature portion S$_i$, V$_i$=$f_{vdebti}$(S$_i$).

Proceeding to block 616, the verifying service 133 can compare the verification numbers V$_i$ to respective portions of the public key 123 Pub$_i$. If each V$_i$=Pub$_i$, then the verifying service 133 can determine that the signature 119 is valid. However, if one or more of the verification numbers fails to match respective components of the public key 123, then the verifying service 133 can determine that the signature 119 is invalid.

Figure 7:
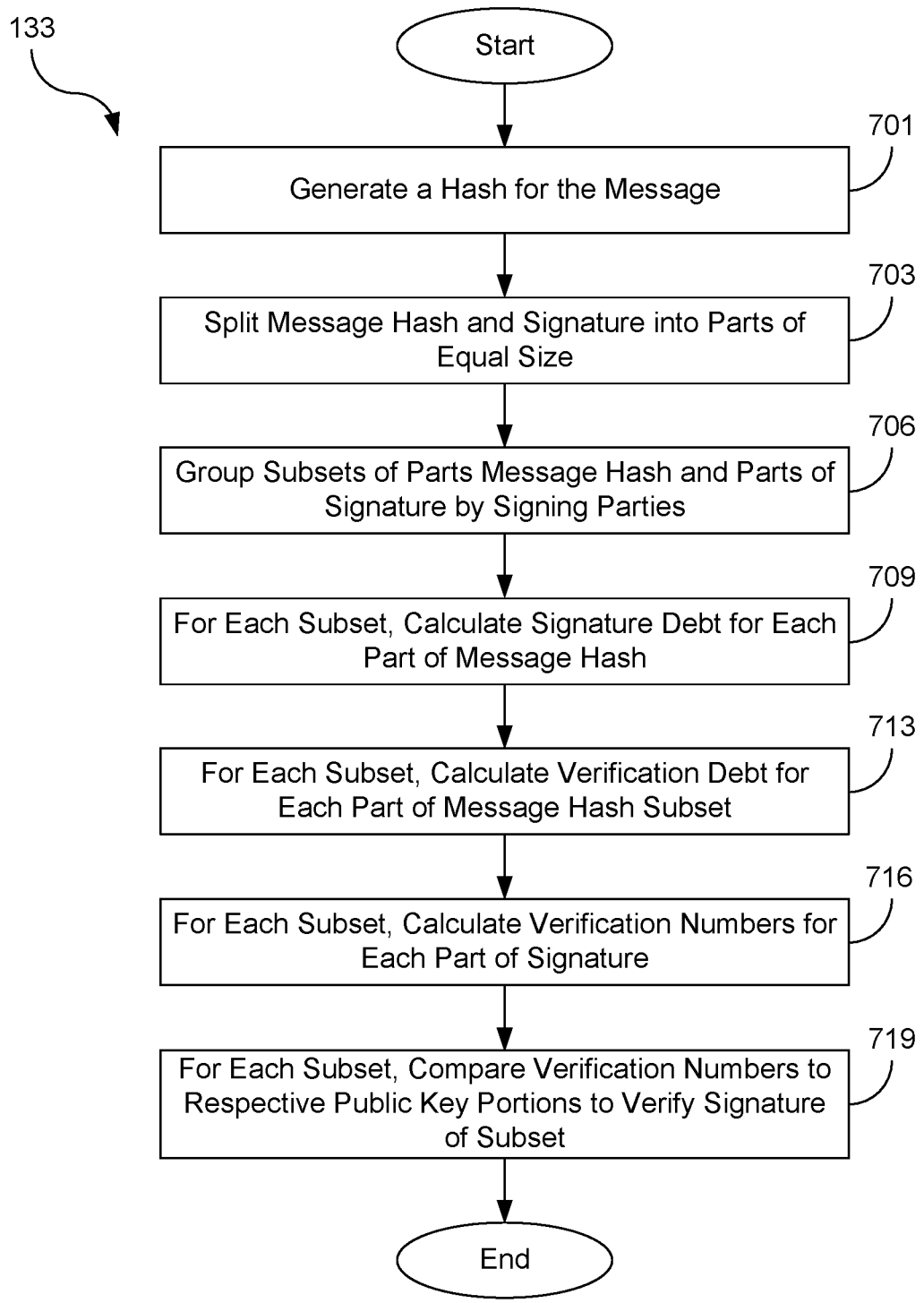
FIG. 7 is a flowchart depicting an example of verifying a signature for a message in the network environment of FIG. 1 according to various embodiments of the present disclosure.

Referring next to FIG. 7, shown is a flowchart that provides one example of the operation of a portion of the verifying service 133 to verify a signature 119 of a message 116, wherein the signature 119 was generated by multiple signing parties. The flowchart of FIG. 7 provides merely an example of the many different types of functional arrangements that can be employed to implement the operation of the depicted portion of the verifying service 133. As an alternative, the flowchart of FIG. 7 can be viewed as depicting an example of elements of a method implemented within the network environment 100.

Beginning with block 701, the verifying service 113 can generate a hash of the message 116. For example, the entire message 116, denoted as M, could be supplied as an input to the cryptographic hash function $f$, such that the hashed message HM=$f$(M).

Then, at block 703, the verifying service 133 can split the message hash HM and the signature 119 into d parts of equal size m. Accordingly, the signature 119 could be split such that S=S$_1$|S$_2$| . . . |S$_d$ and the message hash HM could be split such that HM=HM$_1$| . . . |HM$_d$.

Proceeding to block 706, the verifying service 133 can group individual portions HM$_i$ of the message hash HM into subsets of the message hash HM. The verifying service 133 can also group individual portions S$_i$ of the signature 119 into subsets of the signature 119. In some implementations, specific portions of the message hash HM and the signature 119 can be selected based at least in part on the identity of a signing party. For example, if the message 116 were a transaction request associated with a credit card payment, then information provided by a merchant (e.g., transaction amount, merchant identifier, etc.) might need to be verified with a merchant's public key 123, while information provided by a credit card issuer (e.g., account number, preauthorization code or token, etc.) might need to be verified with the issuer's public key 123.

Moving on to block 709, the verifying service 133 can calculate the signature debt for each portion HM$_i$ of the message hash HM included in the subset. First, the verifying service 133 can calculate the value of the signature debt for each portion of the message hash HM of the message that was signed, denoted as s_debt$_i$. The value of s_debt$_i$=HM$_i$+(rs-1)(2$^m$+1), where "rs" is the current value of the remaining signature counter 129 associated with the public key 123 used to sign the portions HM$_i$ of the message hash HM included in the subset. As previously discussed, the value "rs" may be have been appended to the signature 119 being verified in order to synchronize the remaining signature counter 129 between the signing service 113 and the verifying service 133.

Next, at block 713, the verifying service 133 can calculate the verification debt for each respective part M$_i$ of the message 116 associated with the portions of the signature 119 included in each subset. The verification debt can represent the number of iterations of the cryptographic hash function $f$ to be performed on each portion of the signature 119 to reach the public key 123 for said portion. Mathematically, the verification debt is equal to the difference between the schema debt n and the signature debt, as represented by the equation v_debt$_i$=n-s_debt$_i$.

Then, at block 716, the verifying service 133 can calculate a verification number V$_i$ for each signature portion S$_i$ included in each subset. For any given signature portion S$_i$, V$_i$=$f_{vdebti}$(S$_i$).

Proceeding to block 719, the verifying service 133 can compare the verification numbers V$_i$ to respective portions of the public key 123 Pub$_i$ associated with each signature portion S$_i$ included in each subset. If each V$_i$=Pub$_i$, then the verifying service 133 can determine that the signature 119 is valid. However, if one or more of the verification numbers fails to match respective components of the public key 123, then the verifying service 133 can determine that the signature 119 is invalid.

It should be noted that where multiple subsets of the message hash HM and signature 119 have been identified, the subsets can be processed in parallel. For example, the operations on each subset described in blocks 709 to 719 can be performed in parallel to improve performance, either by the same instance of the verifying service 133 on the verifying device 106 (e.g., by using separate CPU cores, threads, or processes), or by multiple instances of the verifying service 133 operating on multiple, respective verifying devices 106.

Figure 8:
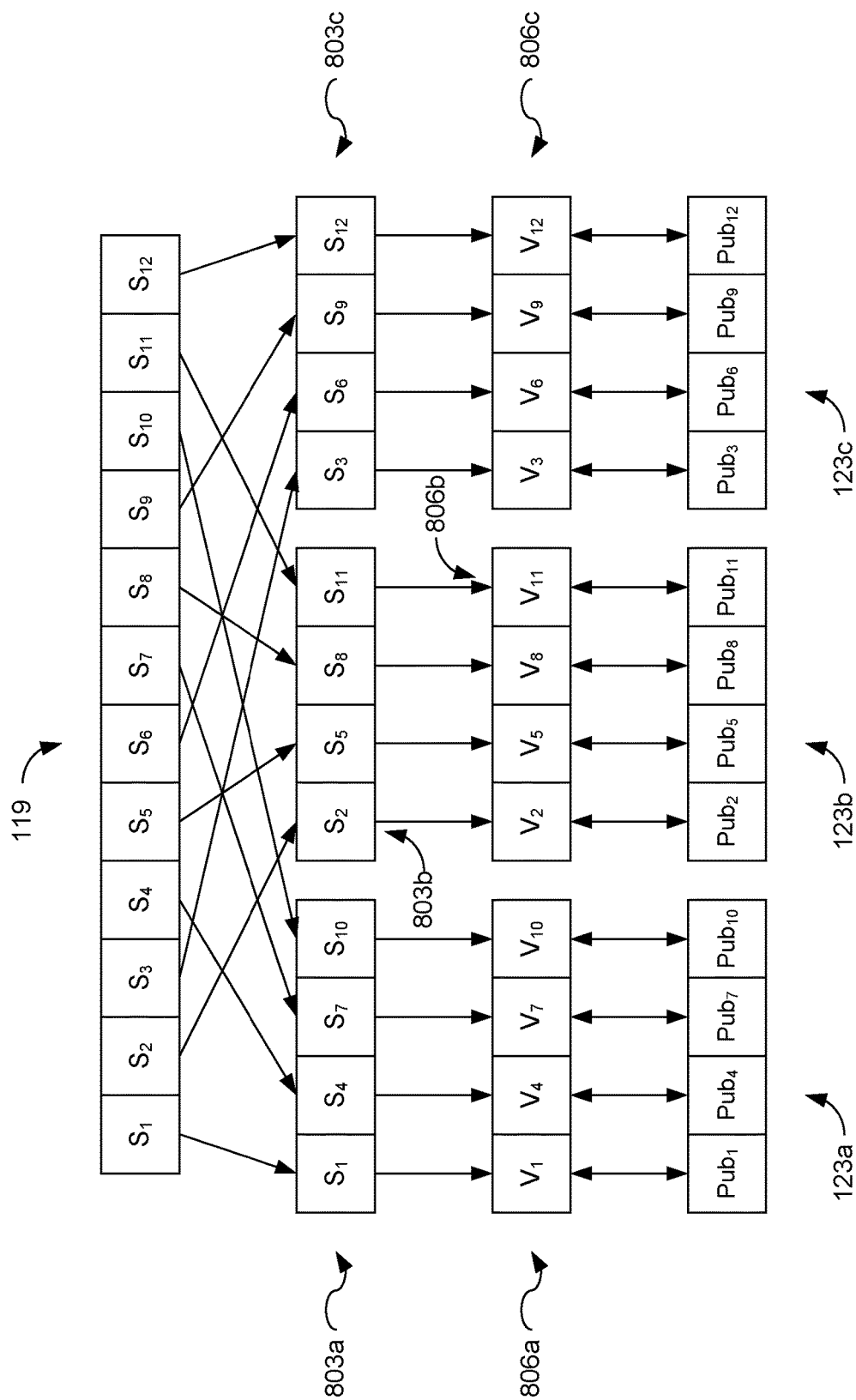
FIG. 8 is a graphical representation of the verification of a signature for a message in the network environment of FIG. 1 according to various embodiments of the present disclosure.

FIG. 8 provides a graphical representation of the process for verifying a multiparty signature 119 as described by the flowchart of FIG. 7. To simplify the example, verification of the multiparty signature 119 illustrated in FIG. 5 is depicted in FIG. 8.

For example, a signature 119 could be divided in to d parts of m size, indicated as S$_1$-S$_{12}$ in the illustrated example. The signature 119 could be split into multiple signature subsets 803a, 803b, and 803c (collectively "signature subsets 803" or generically a "signature subset 803"). Signature subset 803a could contain the concatenation of S$_1$|S$_4$S$_7$|S$_{10}$, for the respective message subset 503a containing M$_1$|M$_4$|M$_7$|M$_{10}$. Signature subset 803b could contain the concatenation of S$_2$|S$_5$S$_8$|S$_{11}$ for the respective message subset 503b containing M$_2$|M$_5$|M$_8$|M$_{11}$. Signature subset 803c could contain the concatenation of S$_3$|S$_6$|S$_9$|S$_{12}$ for the respective message subset 503c containing M$_3$|M$_6$|M$_9$|M$_{12}$.

Verification subsets 806a, 806b, and 806c (collectively "verification subsets 803" or generically a "verification subset 803") could then be generated from the respective signatures subsets 803. Each verification subset 806 could contain a respective verification number V$_i$ for each respective signature portion S$_i$. For example, as illustrated, verification subset 806a could contain verification values V$_1$|V$_4$|V$_7$|V$_{10}$ for respective signature values S$_1$|S$_4$|S$_7$|S$_{10}$. Verification subset 806b could contain verification values V$_2$|V$_5$|V$_8$|V$_{11}$ for respective signature values S$_2$|S$_5$|S$_8$|S$_{11}$. Verification subset 806c could contain verification values V$_3$|V$_6$|V$_9$|V$_{12}$ for respective signature values S$_3$|S$_6$|S$_9$|S$_{12}$.

The verification values V$_i$ could then be compared to the portions Pub$_i$ of the public keys 123a, 123b, and 123c (collectively "public keys 123" or generically a "public key 123") of respective signing private keys 126. For example, if each verification value V$_i$ in verification subset 806a matched each portion Pub$_i$ of public key 123a, then the first portion of the signature 119 would be valid. Likewise, if each verification value $V_i$ in verification subset 806b matched each portion $Pub_i$ of public key 123b, then the second portion of the signature 119 would be valid. Similarly, if each verification value $V_i$ in verification subset 806c matched each portion $Pub_i$ of public key 123c, then the third portion of the signature 119 would be valid. Moreover, if every verification value $V_i$ matches its respective portion $Pub_i$ of a public key 123, then the entire signature 119 could be determined to be valid.

The various embodiments of the present disclosure have a number of use cases for improving the security of existing computing systems and/or computerized transactions. In the following paragraphs, a number of example use cases are described. However, these are not the only use cases which could take advantage of the various embodiments of the present disclosure.

As previously discussed, the various embodiments of the present disclosure allow for multiparty signing of messages or data without having to share private keys or to generate multiple signatures. For example, in a situation where multiple parties need to sign the same message, transaction, etc., all of the signing parties can independently sign the message, transaction, etc., without synchronization between the signing parties. Moreover, the signing parties can generate their signatures in parallel. Likewise, the signature of messages or data could be verified by multiple parties without synchronization between the verifying parties, and the verification of the respective signatures of the signing parties could also be performed in parallel.

In a first use case, multiple merchants could sign the same transaction. Although in this use case, all of the participating merchants would need to sign the same transaction, the individual merchants would not need to synchronize their signatures or signing keys with each other. The signed transaction could then be sent to a verifying party (e.g., a payment processor, credit card issuer, etc.), which could verify the separate signatures of the merchants.

In a second use case, a customer could participate in a signature process along with one or more merchants. For example, if a customer were paying by credit card, the point of sale (POS) device (e.g., credit card terminal, mobile phone, tablet, personal computer, etc.). In this use case, the POS device could sign portions of a transaction authorization request or similar message that were customer specific (e.g., account identifier, card verification value (CVV) or card security code (CSC), card expiration date, customer billing address, transaction amount, etc.), the merchant could sign portions that were merchant specific (e.g., the merchant identifier, transaction date and/or time, transaction amount, etc.), and the merchant could concatenate the portions of the signature generated by the customer with the portions of the signature generated by the merchant to create a signature for the transaction authorization request. The signature could be appended to the transaction authorization request by the merchant to create a signed transaction authorization request, which could be submitted to a verifying party (e.g., a payment processor, credit card issuer, etc.) through preexisting authorization channels or workflows. The verifying party could then determine that both the merchant and the customer signed the transaction authorization request using the previously described implementations of the present disclosure. The verifying party could then return a transaction authorization to the merchant in response. In some implementations, the verifying party could return a transaction approval to the customer using a separate communications channel.

In a third use case, which could be viewed as an extension of the second use case, a credit card issuer could participate in the signature generation process. In these use cases, a credit card issuer could provide a pre-authorization code or token to a merchant for a transaction. This could occur, for example, when a merchant has requested a hold for a requested amount prior to authorization or completion of the transaction. The credit card issuer could participate in a multiparty signature by providing the preauthorization code and/or preauthorization amount to the merchant and signing the preauthorization code or token provided to the merchant and/or the preauthorization amount. The merchant could include the preauthorization code or token and/or the pre-authorization amount in the transaction authorization request. The portions of the transaction authorization request signed by the merchant and the user could be concatenated with the signature generated by the credit card issuer for the preauthorization code or token and/or preauthorization amount to create a multiparty signature for the entire transaction authorization request. The credit card issuer could then verify the signature of the transaction authorization request by verifying the separate portions of the signature created by the credit card issuer, merchant, and user. The verifying party could then return a transaction authorization to the merchant in response. In some implementations, the verifying party could return a transaction approval to the customer using a separate communications channel.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same network environment 100.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A method, comprising:
    hashing a message to generate a message hash;
    splitting the message hash into a predefined number of parts, each of the predefined number of parts being of equal size;
    splitting a signature of the message into the predefined number of parts, each of the predefined number of parts being of equal size;
    calculating a value for a respective signature debt for each of the predefined number of parts of the message hash, wherein the value for the respective signature debt is based at least in part on a current value of a remaining signature counter;
    calculating a value for a verification debt for each of the predefined number of parts of the message hash, the value for the verification debt for each of the predefined number of parts being based at least in part on the value of the respective signature debt for each of the predefined number of parts of the message hash;

calculating a verification value for each of the predefined number of parts of the signature, the verification value being the result of hashing a respective part of the signature by a number of times equal to the value of the verification debt for the respective part of the signature;

splitting a public key into the predefined number of parts, each of the predefined number of parts being of equal size; and comparing the verification value for each of the predefined number of parts of the signature to a respective one of the predefined number of parts of the public key, wherein a mismatch between the verification value for one of the parts of the signature and a respective one of the parts of the public key indicates that the signature is invalid.

2. The method of claim 1, further comprising synchronizing, with a signing computing device, a current value of the remaining signature counter.

3. The method of claim 1, wherein the remaining signature counter is appended to the signature of the message.

4. The method of claim 2, wherein calculating the signature debt for each of the predefined number of parts of the message hash is further based at least in part on the current value of the remaining signature counter.

5. The method of claim 1, further comprising receiving the message or the signature from a signing computing device.

6. The method of claim 1, wherein a length of the message hash is equal to a size of the predefined number of parts multiplied by the predefined number of parts.

7. The method of claim 1, wherein the verification debt represents a difference between a schema debt and the respective signature debt for each of the predefined number of parts of the message hash.

8. A system, comprising:
a computing device comprising a processor and a memory; and
machine-readable instructions stored in the memory that, when executed by the processor, cause the computing device to at least:
hash a message to generate a message hash;
split the message hash into a predefined number of parts, each of the predefined number of parts being of equal size;
split a signature of the message into the predefined number of parts, each of the predefined number of parts being of equal size;
calculate a value for a respective signature debt for each of the predefined number of parts of the message hash, wherein the value for the respective signature debt is based at least in part on a current value of a remaining signature counter;
calculate a verification debt for each of the predefined number of parts of the message hash, the verification debt for each of the predefined number of parts being based at least in part on the value of the respective signature debt for each of the predefined number of parts of the message hash;
calculate a verification value for each of the predefined number of parts of the signature, the verification value being the result of hashing the respective part of the signature by a number of times equal to a value of the verification debt for the respective part of the signature;
split a public key into the predefined number of parts, each of the predefined number of parts being of equal size; and
compare the verification value for each of the predefined number of parts of the signature to a respective one of the predefined number of parts of the public key, wherein a mismatch between the verification value for one of the parts of the signature and a respective one of the parts of the public key indicates that the signature is invalid.

9. The system of claim 8, wherein computing device is a first computing device and the machine-readable instructions further cause the first computing device to at least synchronize with a second computing device a current value of a remaining signature counter.

10. The system of claim 8, wherein a remaining signature counter is appended to the signature of the message.

11. The system of claim 9, wherein the machine-readable instructions that cause the first computing device to at least calculate the signature debt for each of the predefined number of parts of the message hash further cause the computing device to calculate the signature debt based at least in part on the current value of the remaining signature counter.

12. The system of claim 8, wherein the computing device is a first computing device and the machine-readable instructions further cause the first computing device to at least receive, from a second computing device, the message or the signature of the message.

13. The system of claim 8, wherein a length of the message hash is equal to a size of the predefined number of parts multiplied by the predefined number of parts.

14. The system of claim 8, wherein the verification debt represents a difference between a schema debt and the respective signature debt for each of the predefined number of parts of the message hash.

15. A method, comprising:
generating a message hash of a message using a cryptographic hash function;
splitting the message hash into a predefined number of parts of equal size;
calculating a value of a signature debt for each of the predefined number of parts of the message hash;
calculating a respective signature part for each of at least a subset of the predefined number of parts of the message hash by applying the cryptographic hash function to a respective portion of a private key for a number of times equal to the value of the signature debt; and
concatenating the respective signature part for each of at least the subset of the predefined number of parts of the message hash to generate a signature for the message.

16. The method of claim 15, further comprising:
decrementing a remaining signature counter associated with the private key; and
appending the remaining signature counter to the signature.

17. The method of claim 15, wherein a length of the message hash, in bits, is a composite number.

18. The method of claim 15, further comprising generating the private key by:
selecting a predefined number of random numbers, each of the predefined number of random numbers having a length that is greater than or equal to the length of the output of the cryptographic hash function; and
concatenating the predefined random numbers to create the private key.

19. The method of claim 18, further comprising generating a public key for the private key by:
- hashing each of the predefined number of random numbers for a number of times equal to a debt of a signature schema to generate a respective predefined number of hashes; and
- concatenating the respective predefined number of hashes to create the public key.

20. The method of claim 19, wherein each of the predefined number of random numbers having a length that is greater than or equal to the length of the output of the cryptographic hash function.

* * * * *